US009457391B2

(12) United States Patent
McKee et al.

(10) Patent No.: US 9,457,391 B2
(45) Date of Patent: Oct. 4, 2016

(54) APPARATUS AND METHOD FOR DEFORMING A SURFACE

(71) Applicants: Matthew Timothy McKee, Willow Park, TX (US); Russell Miller, Fort Worth, TX (US); Richard A. Luepke, Fort Worth, TX (US)

(72) Inventors: Matthew Timothy McKee, Willow Park, TX (US); Russell Miller, Fort Worth, TX (US); Richard A. Luepke, Fort Worth, TX (US)

(73) Assignee: Lockheed Martin Corporation, Bethesday, MD (US)

(*) Notice: Subject to any disclaimer, the term of this patent is extended or adjusted under 35 U.S.C. 154(b) by 180 days.

(21) Appl. No.: 14/279,899

(22) Filed: May 16, 2014

(65) Prior Publication Data

US 2015/0328672 A1 Nov. 19, 2015

(51) Int. Cl.
*B21D 11/20* (2006.01)
*B23Q 3/06* (2006.01)
*B21D 1/06* (2006.01)
*B21D 1/14* (2006.01)

(52) U.S. Cl.
CPC .............. *B21D 11/20* (2013.01); *B21D 1/06* (2013.01); *B23Q 3/065* (2013.01); *B21D 1/145* (2013.01)

(58) Field of Classification Search
CPC ............ B21D 1/00; B21D 1/06; B21D 1/08; B21D 1/10; B21D 1/12; B21D 1/14; B21D 1/145; B21D 5/01; B21D 11/20; B21D 53/88; B21D 53/92; B23Q 3/065; B23Q 3/084; B23Q 2240/002; B23Q 2240/005; B23Q 2240/007; B23Q 3/06; Y10T 29/53848–29/53891

USPC ............... 72/296, 297, 379.2, 389.1, 390.4, 72/390.5, 390.6, 390.7, 429, 450, 454, 72/457–460, 481.3, 481.4, 481.7, 481.8, 72/482.6, 705; 425/383, 385; 29/256–266
See application file for complete search history.

(56) References Cited

U.S. PATENT DOCUMENTS

| 2,543,347 | A | 2/1951 | Bartlo |
| 3,977,230 | A | 8/1976 | Jones |
| 4,037,448 | A | 7/1977 | Di Maio et al. |
| 4,050,271 | A | 9/1977 | Jones |
| 6,481,257 | B1 | 11/2002 | Chartier |
| 8,516,875 | B1 | 8/2013 | Chan |

FOREIGN PATENT DOCUMENTS

| DE | 200 03 647 UI | 5/2000 |
| DE | 100 26 617 C1 | 11/2001 |
| WO | WO 02/045877 A1 | 6/2002 |

OTHER PUBLICATIONS

EPO communication re: Extended European Search Report for Application No. 15167814.1-1702; Ref. EP100494GM900te, Oct. 7, 2015.

*Primary Examiner* — Peter DungBa Vo
*Assistant Examiner* — Joshua D Anderson
(74) *Attorney, Agent, or Firm* — Baker Botts L.L.P.

(57) ABSTRACT

An apparatus includes a first fitting and an actuator. The first fitting is operable to be coupled to a first surface to be deformed. The actuator includes a second fitting, a third fitting, a lever, a shaft, and a threaded shaft. The second fitting is operable to be coupled to a second surface. The third fitting is operable to be coupled to the second surface. The lever includes a first end and a second end. The lever is operable to be coupled to the second fitting proximate to the first end of the lever. The shaft is operable to be coupled to the first fitting and is further operable to be coupled through the second fitting to the lever proximate to the first end of the lever. The threaded shaft is operable to couple the third fitting to the lever proximate to the second end of the lever.

20 Claims, 4 Drawing Sheets

APPARATUS AND METHOD FOR DEFORMING A SURFACE

TECHNICAL FIELD

This disclosure generally relates to deforming a surface and, more particularly, to an apparatus and method for deforming a surface.

BACKGROUND

During manufacturing, it may be necessary to deform a surface. In certain circumstances, it may be desirable to deform a relatively flat surface to a shape that is suitable for use in a product being manufactured. In certain other circumstances, it may be desirable to displace a surface or object without necessarily deforming the surface or object.

SUMMARY OF EXAMPLE EMBODIMENTS

According to embodiments of the present disclosure, disadvantages and problems associated with previous techniques for deforming a surface may be reduced or eliminated.

In certain embodiments, an apparatus for deforming a surface is disclosed. The apparatus includes a first fitting and an actuator. The first fitting is operable to be coupled to a first portion of a first surface to be deformed. The actuator includes a shaft, a second fitting, a lever, a threaded shaft, and a third fitting. A first end of the shaft is coupled to the first fitting using a lock and key engagement. The second fitting is operable to be coupled to a portion of the shaft and operable to be coupled to a first portion of a second surface. A first end of the lever is coupled to a second end of the shaft using a linkage component. The first end of the lever is coupled to a first end of the linkage component and the second end of the shaft is coupled to a second end of the linkage component. The lever includes a first threaded aperture. At least a portion of the threaded shaft is between portions of the first threaded aperture. The third fitting includes a second threaded aperture. A first end of the threaded shaft is engaged in the second threaded aperture. The third fitting is operable to be coupled to a second portion of the second surface. The apparatus is operable to displace the first surface relative to the second surface. The first fitting is operable to be coupled to a second portion of the first surface to be deformed. The second fitting is operable to be coupled to a third portion of a second surface. The third fitting is operable to be coupled to a fourth portion of the second surface. The apparatus is operable to displace the first surface relative to the second surface when the threaded shaft is manually displaced relative to the second threaded aperture. The apparatus is operable to displace the first surface relative to the second surface when the threaded shaft is mechanically displaced relative to the second threaded aperture. The apparatus is operable to deform the first surface.

Certain embodiments of the disclosure may provide one or more technical advantages. For example, an advantage of some embodiments may be that the use of a lever in combination with a threaded shaft may provide a mechanical advantage, making deformation easier to accomplish. For example, the combination of a lever and a threaded shaft may require a low input force while still resulting in a high output force. This high output force may be useful in manufacturing with materials, such as metal alloys, which are strong and require high force in order to be deformed.

Some embodiments may provide a mechanical advantage of 4 to 1 or any other suitable advantage depending on needs. The mechanical advantage may drastically reduce the amount of input force required for a given application, thus making manufacturing easier. Additionally, some embodiments may allow for fine adjustments to be made in the deformation of a surface.

In certain embodiments of the disclosure, it may be desirable to displace a surface or object without necessarily deforming the surface or object. Certain embodiments may allow for surface or object displacement with a lower input force than would otherwise be required without use of the apparatus of the disclosure. For example, certain embodiments may provide a mechanical advantage in the displacement of a surface or object.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

During manufacturing, it may be necessary to deform a surface. In certain circumstances, it may be desirable to deform a relatively flat surface to a shape that is suitable for use in a product being manufactured. It may be desirable to use an apparatus to deform a surface that produces an output force that is significantly greater than the input force. It may also be desirable to use an apparatus that allows for fine adjustments.

In certain embodiments of the disclosure, it may be desirable to displace a surface or object without necessarily deforming the surface or object. Certain embodiments may allow for surface or object displacement with a lower input force than would otherwise be required without use of the apparatus of the disclosure. For example, certain embodiments may provide a mechanical advantage in the displacement of a surface or object.

In general, the disclosed embodiments illustrate a system and method for deforming a surface. An apparatus includes a first fitting and an actuator. The first fitting may be coupled to a first surface to be deformed. The actuator may be used to apply force to the first fitting, resulting in deformation of the first surface. The actuator may include a shaft, a second fitting, a lever, a threaded shaft, and a third fitting. The shaft may be coupled to the first fitting using a lock and key engagement. The shaft may be coupled to the second fitting, which may be coupled to a second surface. The second surface may be positioned at a fixed position relative to the first surface. A first end of the lever may be coupled to the shaft and the lever may be operable to pivot about an end of the shaft. A second end of the lever may be coupled to a threaded aperture component. A threaded shaft may pass through the threaded aperture of the threaded aperture component. An end of the threaded shaft may be engaged in a second threaded aperture of a third fitting coupled to the second surface. The threaded shaft may be rotated within the first threaded aperture, resulting in displacement of the lever and shaft and a force applied to the first fitting and first surface. This displacement may result in the deformation of the first surface. Rotation of the threaded shaft may be used to make fine adjustments in the deformation of the first surface.

Figure 1:
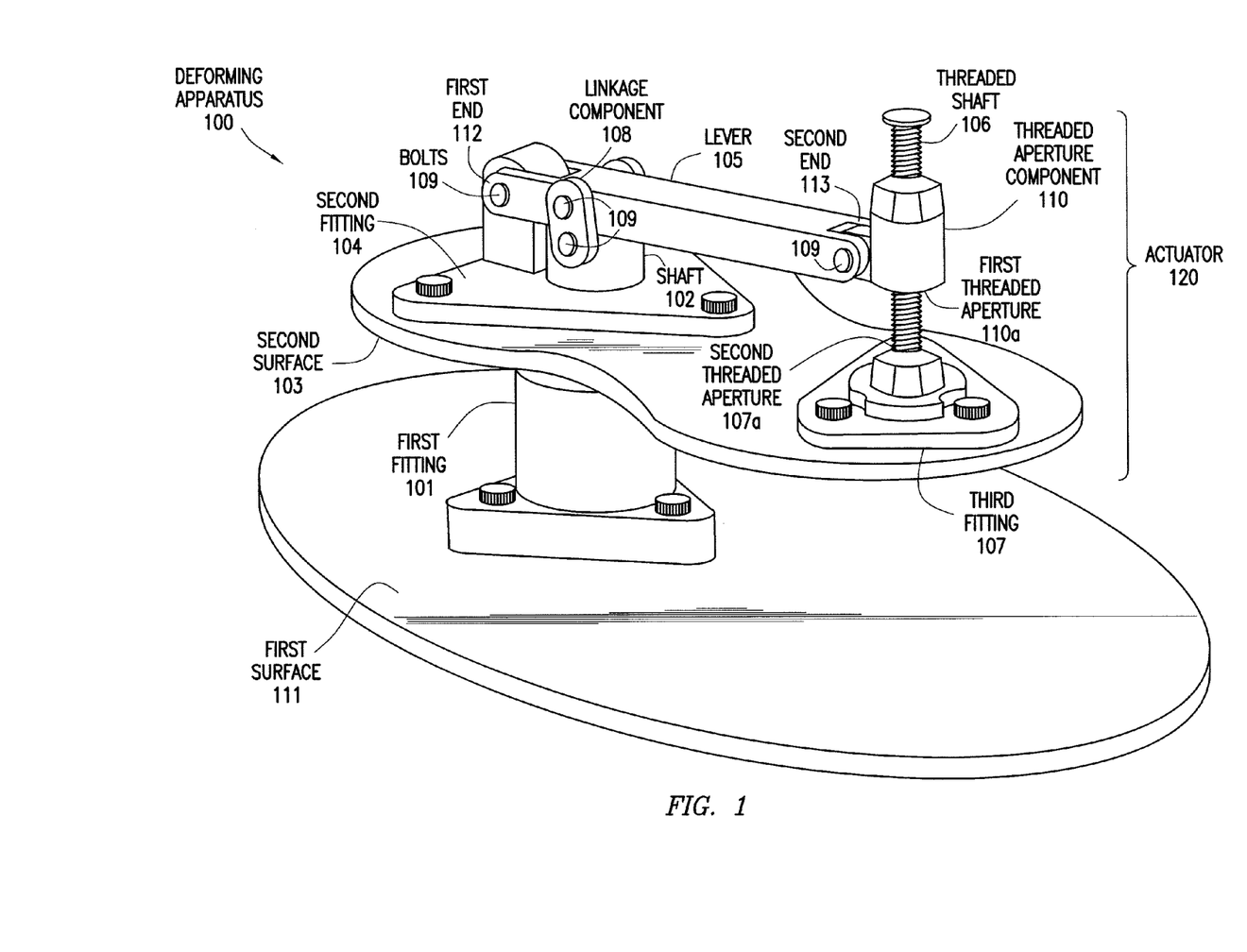
FIG. 1 illustrates an assembled view of an apparatus for deforming a surface in accordance with certain embodiments.
Figure 2:
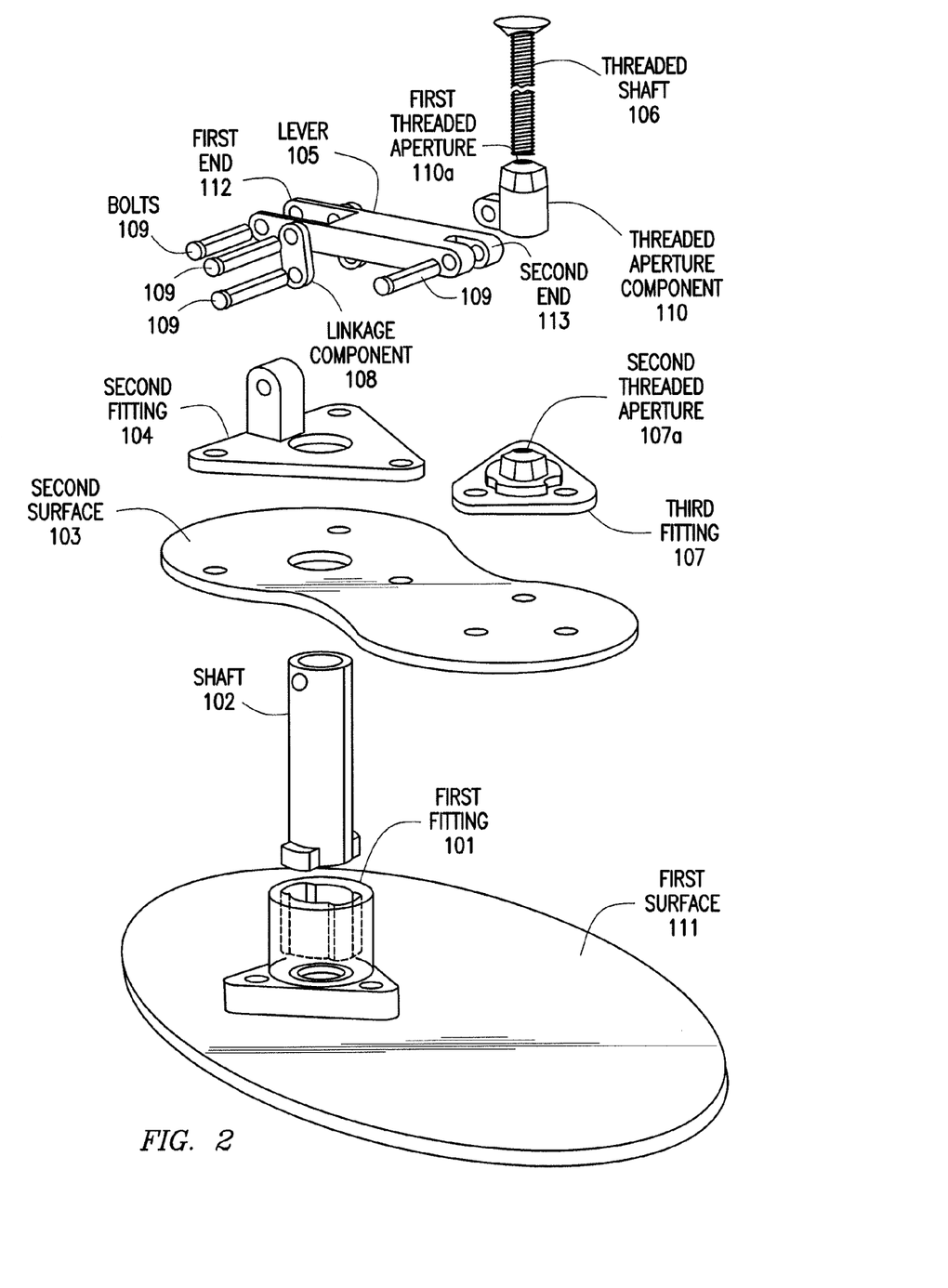
FIG. 2 illustrates an expanded view of the apparatus for deforming a surface of FIG. 1 in accordance with certain embodiments.

FIG. 1 illustrates an assembled view of a deforming apparatus 100 that may be used to deform a surface in accordance with certain embodiments. FIG. 2 illustrates an expanded view of deforming apparatus 100 in accordance with certain embodiments. Deforming apparatus 100 may be used to deform a first surface 111 by displacing first surface 111 relative to a second surface 103. In certain embodiments, and as illustrated in FIGS. 1 and 2, deforming apparatus 100 may include a first fitting 101 and an actuator 120. In certain embodiments, actuator 120 may include a shaft 102, a second fitting 104, a lever 105, a threaded shaft 106, and a third fitting 107. In certain embodiments, actuator 120 may further include a linkage component 108 and bolts 109. Bolts 109 may be used to attach shaft 102 to linkage component 108, to attach linkage component 108 to lever 105, and to attach lever 105 to a threaded-aperture component 110. In certain embodiments, threaded aperture component 110 may include first threaded aperture 110a. In certain embodiments, third fitting 107 may include a second threaded aperture 107a.

First surface 111 may be any surface to be deformed. In some embodiments, a portion of first surface 111 may be relatively flat and a manufacturer may wish to deform a first portion of first surface 111 to be curved. In some embodiments, the manufacturer may wish to use first surface 111 in a product with one or more curved surfaces, such as an aircraft. First surface 111 may be any suitable material. For example, first surface 111 may be aluminum, tin, plastic, or any suitable metal alloy. While first surface 111 may initially be relatively flat, it need not be. For example, first surface 111 may initially be at least partially curved or bent but may need additional deformation.

First fitting 101 may be any fitting for coupling first surface 111 to deforming apparatus 100. First fitting 101 may be removably fastened to first surface 111. For example, first fitting 101 may be fastened to first surface 111 using bolts or in any other suitable method. First fitting 101 may include a hole that allows for a shaft 102 to pass through portions of first fitting 101.

Shaft 102 may be any component that couples first fitting 101 to lever 105. In some embodiments, shaft 102 is substantially cylindrical. Shaft 102 may be coupled to first fitting 101 in any suitable manner. In some embodiments, shaft 102 may be coupled to first fitting 101 using a lock and key mechanism. For example, FIG. 2 illustrates how some embodiments of shaft 102 may include one or more protrusions or "keys" and first fitting 101 may include a "lock" that is adapted to allow entry of the "keys" and allow for shaft 102 to be securely fastened within first fitting 101 when shaft 102 is rotated within the "lock" of first fitting 101.

Second surface 103 may be any rigid surface to which actuator 120 may be attached in order to deform first surface 111. In some embodiments, second surface 103 may be held in place relative to first surface 111. For example, portions of second surface 103 may be securely positioned relative to portions of first surface 111 so that, when a portion of first surface 111 is displaced relative to second surface 103, using deforming apparatus 100, first surface 111 becomes deformed.

Lever 105 may be any rigid member for leveraging force applied using deforming apparatus 100. In some embodiments, lever 105 is coupled to shaft 102 using bolts 109 and linkage component 108 as illustrated. In some embodiments, lever 105 may be operable to pivot about an end of shaft 102.

Linkage component 108 may be any rigid member used to couple lever 105 to shaft 102. In some embodiments, a portion of linkage component 108 may be coupled to shaft 102 and another portion of linkage component 108 may be coupled to lever 105, resulting in shaft 102 being coupled to lever 105.

Threaded aperture component 110 may be any component for coupling threaded shaft 106 to lever 105. In some embodiments, threaded-aperture component 110 may be coupled to lever 105 using one or more bolts 109. Threaded aperture component 110 may include first threaded aperture 110a for accepting threaded shaft 106. In certain embodiments, threaded-aperture component 110 and lever 105 may be a single member. In certain other embodiments, threaded aperture component 110 may be a separate component from lever 105, as illustrated in FIGS. 1 and 2.

Bolts 109 may be any fasteners used to couple components together. In some embodiments, bolts 109 may be used to couple linkage component 108 to shaft 102, to couple linkage component 108 to lever 105 and to couple lever 105 to threaded-aperture component 110. While certain quantities and arrangements of bolts 109 are illustrated in FIGS. 1 and 2, the disclosure anticipates any quantity and arrangement of bolts 109.

Threaded shaft 106 may be any shaft with a threaded surface that couples a third fitting 107 to lever 105. In some embodiments, threaded shaft 106 is a threaded bolt that is inserted through first threaded aperture 110a and then coupled to third fitting 107. In some embodiments, any mechanical or electrical actuator may be coupled to threaded shaft 106 and used to rotate and displace threaded shaft 106.

Third fitting 107 may be any fitting operable to be coupled to second surface 103 in any appropriate manner. Third fitting 107 may include second threaded aperture 107a for accepting threaded shaft 106.

In certain embodiments, deforming apparatus 100 may be operable to displace first surface 111 relative to second surface 103 when threaded shaft 106 is rotated within first threaded aperture 110a. For example, an operator may manually rotate threaded shaft 106 in order to deform first surface 111. In certain other embodiments, deforming apparatus 100 may be operable to displace first surface 111 relative to second surface 103 when threaded shaft 106 is mechanically rotated within first threaded aperture 110a. For example, a motor may be used to rotate threaded shaft 106. In certain embodiments, the output force on first surface 111 may be greater than the input force by manual rotation of threaded shaft 106 or mechanical rotation of threaded shaft 106. In certain embodiments, the output force may be four times the input force or may have any other suitable mechanical advantage depending on needs. In certain embodiments, shaft 102 may be engaged with first fitting 101 using a key and lock engagement. In certain embodiments, deforming apparatus 100 may allow for fine adjustments in deforming a surface such as first surface 111.

In certain embodiments, deforming apparatus 100 may be used to displace first surface 111 without deforming first surface 111. In certain embodiments, deforming apparatus 100 may allow for fine adjustments in displacing a surface such as first surface 111 and may allow for mechanical advantage in displacing first surface 111.

Figure 3:
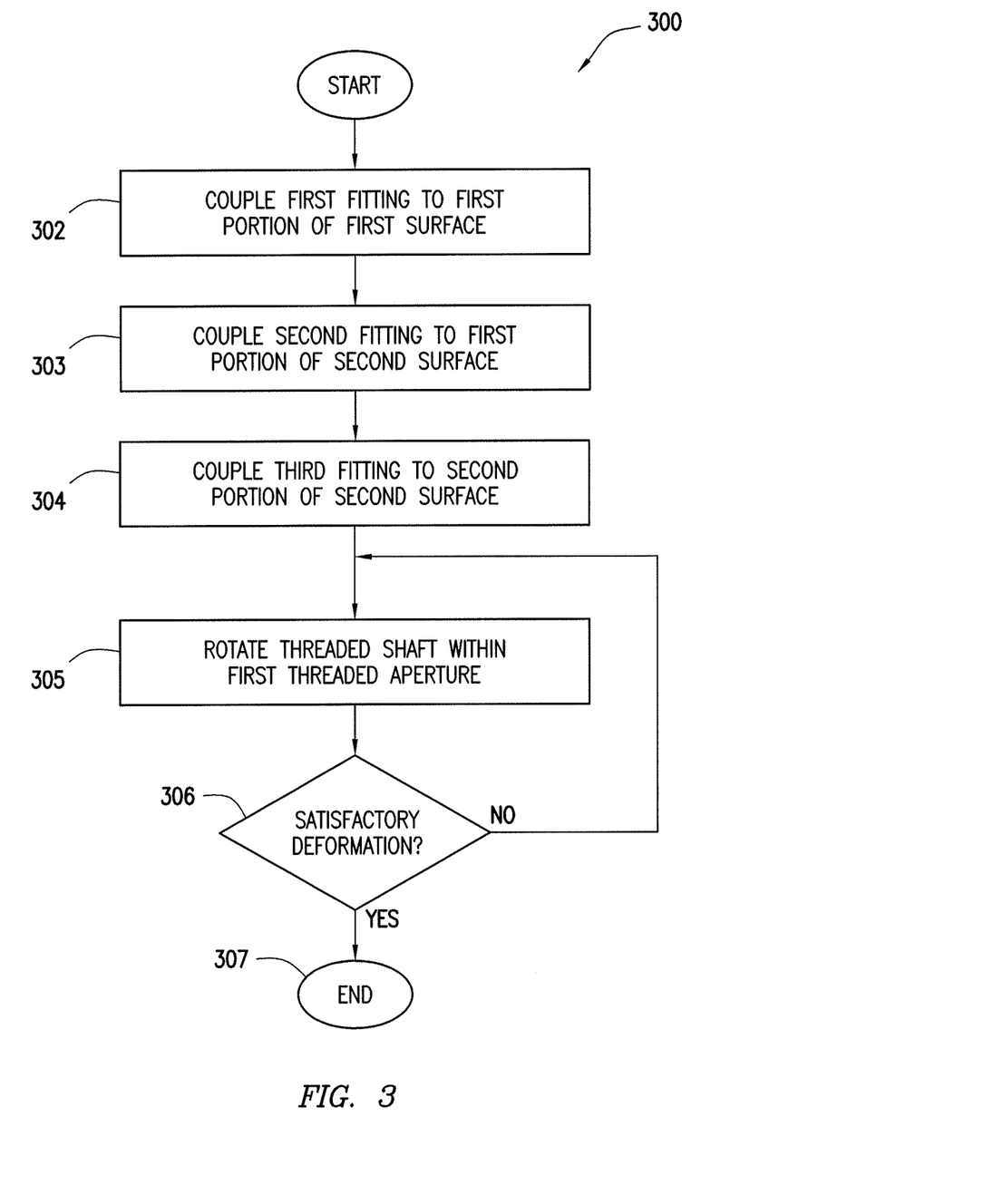
FIG. 3 illustrates a method for deforming a surface in accordance with certain embodiments.

FIG. 3 illustrates a method 300 for deforming a surface in accordance with certain embodiments. The method may start at step 302 in which first fitting 101 is coupled to a first portion of first surface 111. For example, first fitting 101 may be coupled to a first portion of first surface 111 using bolts, another type of fastener, adhesive, or by any other suitable mechanism.

At step 303, second fitting 104 is coupled to a first portion of second surface 103. For example, second fitting 104 may be coupled to a first portion of second surface 103 using bolts, another type of fastener, adhesive, or by any other suitable mechanism.

At step 304, third fitting 107 is coupled to a second portion of second surface 103. For example, third fitting 107 may be coupled to a second portion of second surface 103 using bolts, another type of fastener, adhesive, or by any other suitable mechanism.

At step 305, threaded shaft 106 is rotated within first threaded aperture 110a. In certain embodiments, threaded shaft 106 is manually rotated within first threaded aperture 110a. For example, an operator may rotate threaded shaft 106 within first threaded aperture 110a by manually rotating threaded shaft 106. In certain other embodiments, threaded shaft 106 is mechanically rotated within first threaded aperture 110a. For example, a motor may be used to rotate threaded shaft 106 within first threaded aperture 110a. In certain embodiments, deforming apparatus 100 is operable to displace the first portion of first surface 111 with respect to second surface 103. This displacement may result in deformation of first surface 111.

At step 306, it may be determined whether the deformation of first surface 111 is satisfactory. In certain embodiments, an operator may determine whether first surface 111 is deformed enough or whether first surface 111 needs additional deformation. In certain other embodiments, the determination may be made automatically by a computing system such as the computing system described below in reference to FIG. 4. For example, a combination of one or more sensors and processors may determine whether the deformation is satisfactory. If it is determined in step 306 that the deformation is satisfactory, the method may end at step 307. If it is determined that the deformation is not satisfactory, the method may proceed at step 305 where additional deformation may be made. Steps 305 and 306 may be repeated until the deformation of the first portion of first surface 111 is satisfactory.

In certain embodiments, additional portions of first surface 111 may be deformed. For example, first fitting 101 may be decoupled from the first portion of first surface 111, second fitting 104 may be decoupled from the first portion of second surface 103, and third fitting 107 may be decoupled from the second portion of second surface 103. First fitting 101 may be coupled to a second portion of first surface 111. Second fitting 104 may be coupled to a third portion of second surface 103. Third fitting 107 may be coupled to a fourth portion of second surface 103. Threaded shaft 106 may be manually or mechanically rotated within first threaded aperture 110a to displace the second portion of first surface 111 with respect to second surface 103, resulting in additional deformation of first surface 111. An operator, device, or any combination of devices may be used to determine whether the resulting deformation of the second portion of first surface 111 is satisfactory or whether additional deformation is preferred. If additional deformation is preferred, threaded shaft 106 may be again displaced relative to second threaded aperture 107a. If no additional deformation of the second portion of first surface 111 is needed, deforming apparatus 100 may be removed from first surface 111 and second surface 103. Deforming apparatus 100 may be coupled to additional portions of first surface 111 and second surface 103 and threaded shaft 106 may be rotated to deform additional portions of first surface 111 until deformation of first surface 111 is satisfactory.

In certain embodiments, method 300 may be used to displace first surface 111 without necessarily deforming first surface 111.

Figure 4:
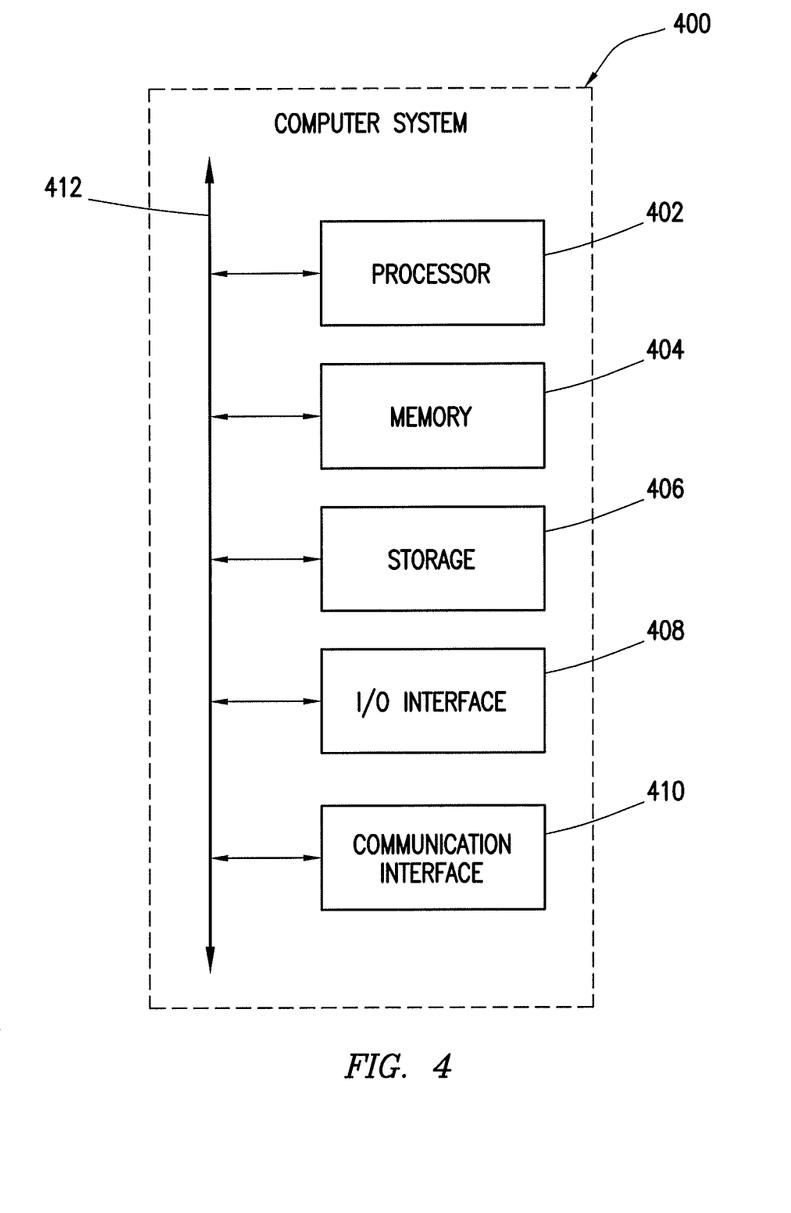
FIG. 4 illustrates an example computer system in accordance with certain embodiments.

FIG. 4 illustrates an example computer system 400 in accordance with certain embodiments. In particular embodiments, one or more computer systems 400 is used to control deformation of first surface 111. In particular embodiments, computer system 400 is used in performing one or more steps of one or more methods described or illustrated herein. In particular embodiments, one or more computer systems 400 provide functionality described or illustrated herein. In particular embodiments, software running on one or more computer systems 400 is used to perform one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In certain embodiments, the use of deforming apparatus 100 in accordance with certain embodiments of the present disclosure may allow deformation of first surface 111. In certain embodiments, use of lever 105 in combination with threaded shaft 106 may advantageously allow for a mechanical advantage in deforming of first surface 111, making deformation easier to accomplish. For example, the combination of lever 105 and threaded shaft 106 may require a low input force while still resulting in a high output force. This high output force may be useful in manufacturing with materials, such as metal alloys, which are strong and require high force in order to be deformed. For example, rotating threaded shaft 106 may apply an upward or downward force to an end of lever 105. Lever 105 may utilize the torque driven force to produce linear force on shaft 102. This may, for example, provide a mechanical advantage of 4 to 1 or any other suitable advantage depending on needs. The resulting force on shaft 102 may be used to deform first surface 111 relative to second surface 103. The mechanical advantage may drastically reduce the amount of input force required for a given application. In certain embodiments, this may make deformation of surfaces for manufacturing easier. Additionally, deforming apparatus 100 may be used to make fine adjustments in the deformation of first surface 111.

In certain embodiments of the disclosure, it may be desirable to displace a surface or object without necessarily deforming the surface or object. Certain embodiments may allow for surface or object displacement with a lower input force than would otherwise be required without use of the apparatus of the disclosure. For example, certain embodiments may provide a mechanical advantage in the displacement of a surface or object.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:
1. An apparatus, comprising:
a first fitting operable to be coupled to a first surface to be deformed; and
an actuator comprising:
a second fitting operable to be coupled to a second surface;
a third fitting operable to be coupled to the second surface;

a lever comprising a first end and a second end, the first end of the lever operable to be coupled to the second fitting;

a shaft operable to be coupled to the first fitting using a lock and key engagement and further operable to pass through the second fitting and couple to the first end of the lever; and a threaded shaft comprising a first end and a second end, the threaded shaft operable to couple the third fitting to the second end of the lever;

wherein the apparatus is operable to displace the first surface relative to the second surface when the threaded shaft is rotated.

2. The apparatus of claim 1, wherein the apparatus is operable to displace the first surface relative to the second surface when the threaded shaft is manually rotated.

3. The apparatus of claim 1, wherein the apparatus is operable to displace the first surface relative to the second surface when the threaded shaft is mechanically rotated.

4. The apparatus of claim 1, wherein the shaft is operable to be coupled to the lever using a linkage component.

5. The apparatus of claim 1, further comprising a threaded aperture component coupled to the second end of the threaded shaft, the threaded aperture component comprising a threaded aperture configured to accept the threaded shaft.

6. An apparatus, comprising:
a first fitting operable to be coupled to a first surface to be deformed; and
an actuator comprising:
a second fitting operable to be coupled to a second surface;
a third fitting operable to be coupled to the second surface;
a lever comprising a first end and a second end, the first end of the lever operable to be coupled to the second fitting;
a shaft operable to be coupled to the first fitting and further operable to pass through the second fitting and couple to the first end of the lever; and
a threaded shaft comprising a first end and a second end, the threaded shaft operable to couple the third fitting to the second end of the lever.

7. The apparatus of claim 6, wherein the shaft is separate from the first fitting.

8. The apparatus of claim 6, wherein the shaft is operable to be coupled to the first fitting using a lock and key engagement.

9. The apparatus of claim 6, wherein the apparatus is operable to displace the first surface relative to the second surface.

10. The apparatus of claim 9, wherein the apparatus is operable to displace the first surface relative to the second surface when the threaded shaft is manually rotated.

11. The apparatus of claim 9, wherein the apparatus is operable to displace the first surface relative to the second surface when the threaded shaft is mechanically rotated.

12. The apparatus of claim 6, wherein the first end of the lever is coupled to the second end of the shaft using a linkage component, the first end of the lever being coupled to a first end of the linkage component and the second end of the shaft being coupled to a second end of the linkage component.

13. The apparatus of claim 6, wherein:
the first fitting is operable to be coupled to a second portion of the first surface to be deformed;
the second fitting is operable to be coupled to a third portion of a second surface; and
the third fitting is operable to be coupled to a fourth portion of the second surface.

14. A method, comprising:
coupling a first fitting to a first surface to be deformed;
coupling the first fitting to a first end of a shaft;
coupling a second fitting to a second surface;
coupling a second end of the shaft to a lever by passing the shaft through the second fitting;
coupling a first end of the lever to the second fitting;
coupling a third fitting to the second surface;
coupling the third fitting to a second end of the lever using a threaded shaft, the second end of the lever being opposite from the first end of the lever; and
displacing the first surface relative to the second surface by rotating the threaded shaft.

15. The method of claim 14, wherein the shaft is separate from the first fitting.

16. The method of claim 14, wherein the shaft is coupled to the first fitting using a lock and key engagement.

17. The method of claim 14, further comprising:
coupling a threaded aperture component to the second end of the lever; and
inserting the threaded shaft through a threaded aperture in the threaded aperture component.

18. The method of claim 14, wherein rotating the threaded shaft comprises manually rotating the threaded shaft.

19. The method of claim 14, wherein rotating the threaded shaft comprises mechanically rotating the threaded shaft.

20. The method of claim 14, wherein the first end of the lever is coupled to the second end of the shaft using a linkage component.

* * * * *